United States Patent
Mukherjee et al.

(10) Patent No.: US 12,432,145 B2
(45) Date of Patent: Sep. 30, 2025

(54) SYSTEM AND METHOD FOR CONGESTION CONTROL USING A FLOW LEVEL TRANSMIT MECHANISM

(71) Applicant: Enfabrica Corporation, Mountain View, CA (US)

(72) Inventors: Shrijeet Mukherjee, Mountain View, CA (US); Shimon Muller, Mountain View, CA (US); Carlo Contavalli, Mountain View, CA (US); Gurjeet Singh, Mountain View, CA (US); Ariel Hendel, Mountain View, CA (US); Rochan Sankar, Mountain View, CA (US)

(73) Assignee: Enfabrica Corporation, Mountain View, CA (US)

( * ) Notice: Subject to any disclaimer, the term of this patent is extended or adjusted under 35 U.S.C. 154(b) by 195 days.

(21) Appl. No.: 17/886,026

(22) Filed: Aug. 11, 2022

(65) Prior Publication Data

US 2023/0059755 A1    Feb. 23, 2023

Related U.S. Application Data

(60) Provisional application No. 63/232,078, filed on Aug. 11, 2021.

(51) Int. Cl.
    *H04L 47/11* (2022.01)
    *H04L 47/12* (2022.01)
    *H04L 47/62* (2022.01)

(52) U.S. Cl.
    CPC ............ *H04L 47/115* (2013.01); *H04L 47/12* (2013.01); *H04L 47/6215* (2013.01)

(58) Field of Classification Search
    CPC ..... H04L 47/115; H04L 47/12; H04L 47/6215
    See application file for complete search history.

(56) References Cited

U.S. PATENT DOCUMENTS

| | | | |
|---|---|---|---|
| 6,594,712 B1 | 7/2003 | Pettey et al. | |
| 6,667,974 B1 | 12/2003 | Shigeta | |

(Continued)

FOREIGN PATENT DOCUMENTS

| | | | |
|---|---|---|---|
| EP | 2768188 A1 | 8/2014 | |
| EP | 3661141 A1 | 6/2020 | |

(Continued)

OTHER PUBLICATIONS

International Search Report and Written Opinion for International Patent Application No. PCT/US2022/011491, dated Mar. 24, 2022 (23 pages).

(Continued)

*Primary Examiner* — Sujoy K Kundu
*Assistant Examiner* — Weibin Huang
(74) *Attorney, Agent, or Firm* — Goodwin Procter LLP (57) ABSTRACT

A system for congestion control using a flow level transmit mechanism is disclosed. In some embodiments, the system comprises a source SFA and a receive SFA. The source SFA is configured to detect and classify a congestion notification packet (CNP) generated based on congestion in a network; select a receive block from a plurality of receive blocks based on the CNP; forward the CNP to a dedicated congestion notification queue of the receive block; identify a transmit queue from a plurality of transmit blocks based on processing the congestion notification queue, wherein the transmit queue originated a particular transmit flow causing the congestion; and stop the transmit queue.

20 Claims, 5 Drawing Sheets

(56) References Cited

U.S. PATENT DOCUMENTS

| | | |
|---|---|---|
| 7,181,541 B1 | 2/2007 | Burton et al. |
| 7,191,225 B1 | 3/2007 | Borthakur |
| 7,245,586 B2 | 7/2007 | Bitar et al. |
| 7,293,129 B2 | 11/2007 | Johnsen et al. |
| 7,697,422 B1 | 4/2010 | Arad et al. |
| 7,937,447 B1 | 5/2011 | Cohen et al. |
| 8,234,407 B2 | 7/2012 | Sugumar et al. |
| 8,301,717 B2 | 10/2012 | Deshpande |
| 8,719,456 B2 | 5/2014 | Wilkinson |
| 8,917,734 B1 | 12/2014 | Brown |
| 9,049,265 B1 | 6/2015 | Greenfield et al. |
| 9,164,702 B1 | 10/2015 | Nesbit et al. |
| 9,448,901 B1 | 9/2016 | Aslam et al. |
| 9,648,102 B1 | 5/2017 | Davis et al. |
| 9,684,597 B1 | 6/2017 | Eiriksson |
| 9,864,519 B2 | 1/2018 | Meyer et al. |
| 9,934,152 B1 | 4/2018 | Bryant et al. |
| 10,152,428 B1 | 12/2018 | Alshawabkeh et al. |
| 10,169,279 B2 | 1/2019 | Yokoyama |
| 10,374,945 B1 | 8/2019 | Dhanabalan et al. |
| 10,447,767 B2 | 10/2019 | Baptist et al. |
| 10,503,658 B2 | 12/2019 | Basu et al. |
| 10,778,521 B2 | 9/2020 | Liguori et al. |
| 10,880,204 B1 | 12/2020 | Shalev et al. |
| 10,931,588 B1 | 2/2021 | Matthews et al. |
| 10,944,660 B2 | 3/2021 | Hurson et al. |
| 11,934,318 B2 | 3/2024 | Fan et al. |
| 11,947,483 B2 | 4/2024 | Helps et al. |
| 11,972,292 B1 | 4/2024 | Fan |
| 2001/0046212 A1 | 11/2001 | Nakajima |
| 2002/0071450 A1 | 6/2002 | Gasbarro et al. |
| 2002/0078271 A1 | 6/2002 | Berry |
| 2002/0129272 A1 | 9/2002 | Terrell et al. |
| 2002/0159385 A1 | 10/2002 | Susnow et al. |
| 2002/0184452 A1 | 12/2002 | Simmons et al. |
| 2002/0191599 A1 | 12/2002 | Parthasarathy et al. |
| 2003/0058875 A1 | 3/2003 | Arndt et al. |
| 2003/0154412 A1 | 8/2003 | Hetzler et al. |
| 2004/0049603 A1 | 3/2004 | Boyd et al. |
| 2005/0068798 A1 | 3/2005 | Lee et al. |
| 2005/0080920 A1 | 4/2005 | Bender et al. |
| 2005/0089033 A1 | 4/2005 | Gupta et al. |
| 2005/0223118 A1 | 10/2005 | Tucker et al. |
| 2006/0004941 A1 | 1/2006 | Shah et al. |
| 2006/0056308 A1* | 3/2006 | Gusat .................... H04L 45/00 370/254 |
| 2006/0056405 A1 | 3/2006 | Chang et al. |
| 2006/0059242 A1 | 3/2006 | Blackmore et al. |
| 2006/0090014 A1 | 4/2006 | Wong et al. |
| 2006/0236063 A1 | 10/2006 | Hausauer et al. |
| 2006/0242352 A1 | 10/2006 | Torudbakken et al. |
| 2006/0251109 A1 | 11/2006 | Muller et al. |
| 2006/0253619 A1 | 11/2006 | Torudbakken et al. |
| 2006/0271713 A1 | 11/2006 | Xie et al. |
| 2007/0038794 A1 | 2/2007 | Purcell et al. |
| 2007/0104102 A1 | 5/2007 | Opsasnick |
| 2007/0255802 A1 | 11/2007 | Aloni et al. |
| 2007/0283123 A1 | 12/2007 | Vick et al. |
| 2008/0031266 A1 | 2/2008 | Tallet et al. |
| 2008/0043732 A1 | 2/2008 | Desai et al. |
| 2008/0168194 A1 | 7/2008 | Gregg et al. |
| 2009/0083392 A1 | 3/2009 | Wong et al. |
| 2009/0113143 A1 | 4/2009 | Domsch et al. |
| 2009/0172301 A1 | 7/2009 | Ebersole et al. |
| 2010/0064070 A1 | 3/2010 | Yoshimura et al. |
| 2010/0103837 A1 | 4/2010 | Jungck et al. |
| 2010/0161870 A1 | 6/2010 | Daniel |
| 2010/0232448 A1 | 9/2010 | Sugumar et al. |
| 2010/0312850 A1 | 12/2010 | Deshpande |
| 2011/0072204 A1 | 3/2011 | Chang et al. |
| 2011/0072234 A1 | 3/2011 | Chinya et al. |
| 2011/0268119 A1 | 11/2011 | Pong et al. |
| 2011/0271010 A1 | 11/2011 | Kenchammana et al. |
| 2012/0166690 A1 | 6/2012 | Regula |
| 2013/0024591 A1 | 1/2013 | Sun |
| 2013/0031328 A1 | 1/2013 | Kelleher et al. |
| 2013/0132536 A1 | 5/2013 | Zhang et al. |
| 2013/0318322 A1 | 11/2013 | Shetty et al. |
| 2014/0237156 A1 | 8/2014 | Regula et al. |
| 2015/0026286 A1 | 1/2015 | Sharp et al. |
| 2015/0082000 A1 | 3/2015 | Hong et al. |
| 2015/0089009 A1 | 3/2015 | Tsirkin et al. |
| 2016/0070475 A1 | 3/2016 | Zhang et al. |
| 2016/0085450 A1 | 3/2016 | Ahn et al. |
| 2016/0094553 A1 | 3/2016 | Azgin et al. |
| 2016/0162422 A1 | 6/2016 | Weber |
| 2016/0269305 A1* | 9/2016 | Sreeramoju .......... H04L 47/2483 |
| 2017/0097909 A1 | 4/2017 | Simionescu et al. |
| 2017/0132148 A1 | 5/2017 | Liu et al. |
| 2017/0177520 A1 | 6/2017 | Kampe et al. |
| 2017/0177528 A1 | 6/2017 | Harriman et al. |
| 2017/0185528 A1 | 6/2017 | Hansson et al. |
| 2017/0372088 A1 | 12/2017 | Zhao et al. |
| 2018/0004703 A1 | 1/2018 | Sharma et al. |
| 2018/0024938 A1 | 1/2018 | Paltashev et al. |
| 2018/0046411 A1 | 2/2018 | Coburn et al. |
| 2018/0052793 A1 | 2/2018 | Fang |
| 2018/0176134 A1 | 6/2018 | Pignataro et al. |
| 2018/0191623 A1 | 7/2018 | Marty et al. |
| 2018/0198715 A1* | 7/2018 | Shmilovici .......... H04L 47/2483 |
| 2018/0241629 A1 | 8/2018 | Sato et al. |
| 2018/0359219 A1 | 12/2018 | Israel et al. |
| 2019/0102310 A1 | 4/2019 | Ramrakhyani et al. |
| 2019/0116121 A1 | 4/2019 | Friedman et al. |
| 2019/0141041 A1 | 5/2019 | Bhabbur et al. |
| 2019/0173810 A1 | 6/2019 | Shpiner et al. |
| 2019/0188146 A1 | 6/2019 | Dusanapudi et al. |
| 2019/0220425 A1 | 7/2019 | Zemach et al. |
| 2019/0258415 A1 | 8/2019 | Imamura |
| 2019/0294366 A1 | 9/2019 | Kawamura et al. |
| 2019/0320019 A1 | 10/2019 | Hamrick, Jr. |
| 2019/0324917 A1 | 10/2019 | Cui et al. |
| 2019/0334828 A1 | 10/2019 | Fairhurst et al. |
| 2019/0370173 A1 | 12/2019 | Boyer et al. |
| 2019/0379767 A1 | 12/2019 | Sharma et al. |
| 2020/0004685 A1 | 1/2020 | Guim Bernat et al. |
| 2020/0119753 A1 | 4/2020 | Chirca et al. |
| 2020/0159669 A1 | 5/2020 | Duncan et al. |
| 2020/0177513 A1* | 6/2020 | Zhang .................. H04L 67/5651 |
| 2020/0204489 A1 | 6/2020 | Pianigiani et al. |
| 2020/0236052 A1 | 7/2020 | Srinivasan et al. |
| 2020/0264985 A1 | 8/2020 | Lee |
| 2020/0280518 A1* | 9/2020 | Lee .................... H04L 47/115 |
| 2020/0371955 A1 | 11/2020 | Goodacre et al. |
| 2020/0387405 A1 | 12/2020 | Xiao et al. |
| 2021/0019069 A1 | 1/2021 | Sen et al. |
| 2021/0037107 A1 | 2/2021 | Klenk et al. |
| 2021/0075633 A1 | 3/2021 | Sen et al. |
| 2021/0083981 A1* | 3/2021 | Shmilovici .............. H04L 45/74 |
| 2021/0132999 A1 | 5/2021 | Haywood et al. |
| 2021/0232312 A1 | 7/2021 | Prasad et al. |
| 2021/0234706 A1 | 7/2021 | Nair et al. |
| 2021/0297350 A1 | 9/2021 | Vegesna et al. |
| 2021/0318961 A1 | 10/2021 | Peterson et al. |
| 2021/0345112 A1 | 11/2021 | Elliott et al. |
| 2022/0004512 A1 | 1/2022 | Cannata et al. |
| 2022/0060422 A1* | 2/2022 | Sommers ................ H04L 43/50 |
| 2022/0085916 A1 | 3/2022 | Debbage et al. |
| 2022/0109587 A1 | 4/2022 | Sapio et al. |
| 2022/0197787 A1 | 6/2022 | Han et al. |
| 2022/0200906 A1* | 6/2022 | Ye .......................... H04L 41/145 |
| 2022/0214912 A1 | 7/2022 | Julien et al. |
| 2022/0217085 A1 | 7/2022 | Sankar et al. |
| 2022/0222118 A1 | 7/2022 | Wang et al. |
| 2022/0248251 A1* | 8/2022 | Ryu ........................ H04W 24/08 |
| 2022/0283964 A1 | 9/2022 | Burstein et al. |
| 2022/0291875 A1 | 9/2022 | Diaz-Cuellar et al. |
| 2022/0394014 A1 | 12/2022 | Wang et al. |
| 2023/0038094 A1 | 2/2023 | Velasco |
| 2023/0044342 A1 | 2/2023 | Wilkinson |
| 2023/0051781 A1 | 2/2023 | Patel et al. |
| 2023/0093247 A1 | 3/2023 | Kumar et al. |
| 2023/0096451 A1 | 3/2023 | Johnson et al. |
| 2024/0028209 A1 | 1/2024 | Berke et al. |

(56) References Cited

U.S. PATENT DOCUMENTS

| | | | |
|---|---|---|---|
| 2024/0098023 A1* | 3/2024 | Guo | H04L 47/127 |
| 2024/0296138 A1 | 9/2024 | Helps et al. | |
| 2024/0311310 A1 | 9/2024 | Fan et al. | |
| 2024/0414087 A1 | 12/2024 | Ranjan et al. | |
| 2024/0422100 A1 | 12/2024 | Helps et al. | |

FOREIGN PATENT DOCUMENTS

| | | | |
|---|---|---|---|
| WO | WO-2005106693 A2 | 11/2005 | |
| WO | WO-2009120798 A2 | 10/2009 | |
| WO | WO-2020055921 A1 | 3/2020 | |
| WO | WO-2022005322 A1 | 1/2022 | |
| WO | WO-2022108498 A1 | 5/2022 | |
| WO | WO-2022198552 A1 | 9/2022 | |
| WO | WO-2024102915 A1 | 5/2024 | |

OTHER PUBLICATIONS

International Search Report and Written Opinion for International Patent Application No. PCT/US2022/32841, dated Nov. 21, 2022 (10 pages).

International Search Report and Written Opinion for International Patent Application No. PCT/US2022/74833, dated Dec. 6, 2022 (8 pages).

International Search Report and Written Opinion for International Patent Application No. PCT/US2023/062168, dated May 12, 2023 (54 pages).

International Search Report and Written Opinion for International Patent Application No. PCT/US2023/61405, dated Jul. 11, 2023 (6 pages).

NPT-Emulex Corporation. "Emulex provides 10Gb Ethernet Virtual Fabric Adapter 5 for New Lenovo Servers." Business Wire. Dec. 15, 2014 (Dec. 15, 2014) Retrieved on Mar. 7, 2022 (Mar. 7, 2022 from https://www.businesswire.com/news/home/20141215005718/en/ Emulexprovides-1 0Gb-Ethernet-Vi rtual-F abri c-Adapter-5-New-Lenovo-Ervers <https://www.businesswire.com/news/home/ 20141215005718/en/Emulexprovides-1%200Gb-Ethernet-Vi%20rtual-F%20abri%20c-Adapter-5-New-Lenovo-Ervers>enti re document.

International Search Report and Written Opinion for International Patent Application No. PCT/US2023/082132, dated Jun. 6, 2024 (8 pages).

International Search Report and Written Opinion for International Patent Application No. PCT/US2024/029723, dated Aug. 22, 2024 (13 pages).

U.S. Appl. No. 17/570,261, filed Jan. 6, 2022, Server Fabric Adapter for I/O Scaling of Heterogeneous and Accelerated Compute Systems, Rochan Sankar, et al.

U.S. Appl. No. 18/778,611, filed Jul. 19, 2024, Server Fabric Adapter for I/O Scaling of Heterogeneous and Accelerated Compute Systems, Rochan Sankar, et al.

U.S. Appl. No. 18/747,118, filed Jun. 18, 2024, Optimally Balanced Network Systems, Rochan Sankar, et al.

U.S. Appl. No. 17/836,532, filed Jun. 9, 2022, Transparent Remote Memory Access Over Network Protocol, Thomas Norrie, et al.

U.S. Appl. No. 18/755,372, filed Jun. 26, 224, Transparent Remote Memory Access Over Network Protocol, Thomas Norrie, et al.

U.S. Appl. No. 18/102,033, filed Jan. 26, 2023, System and Method for One-Sided Read RA Using Linked Queues, Shrijeet Mukerjee, et al.

U.S. Appl. No. 18/107,324, filed Feb. 8, 2023, System and Method for Using Dynamic Thresholds With Route Isolation for Heterogeneous Traffic in Shared Memory Packet Buffers, Ari Aravinthan, et al.

U.S. Appl. No. 18/447,180, filed Aug. 9, 2023, System and Method for Ghost Bridging, Thomas Norrie, et al.

U.S. Appl. No. 18/666,548, filed May 16, 2024, System and Method for an Optimized Staging Buffer for Broadcast/Multicast Operations, Shrijeet Mukherjee, et al.

U.S. Appl. No. 18/526,727, filed Dec. 1, 2023, A Modular Datacenter Interconnection System, David Skirmont, et al.

U.S. Appl. No. 18/785,542, filed Jul. 26, 2024, Method and System for Tracking and Moving Pages Within a Memory Hierarchy, Shrijeet Mukhrjee, et al.

Regula, J., Using Non-transparent Bridging in PCI Express Systems, by Jun. 1, 2004, Jun. 1, 2004, pp. 4-30, XP002686987, URL:http :/ /www.plxtech.com/files/pdf/technical/expresslane/ NontransparentBridging .pdf.

International Search Report and Written Opinion for International Patent Application No. PCT/US2023/029887, dated Oct. 26, 2023 (13 pages).

International Search Report and Written Opinion for International Patent Application No. PCT/US2024/039765, dated Oct. 22, 2024 (15 pages).

Sanker, Rochan, Foundational Fabrics for AI: Introducing the Accelerated Compute Fabric Switch AI Hardware Summit, Sep. 13, 2023.

U.S. Appl. No. 17/570,261, filed Jan. 6, 2022, Server Fabric Adapter for I/O Scaling of Heterogeneous and Accelerated Compute Systems, Sankar, et al.

U.S. Appl. No. 18/778,611, filed Jul. 19, 2024, Server Fabric Adapter for I/O Scaling of Heterogeneous and Accelerated Compute Systems, Sankar, et al.

U.S. Appl. No. 19/037,768, filed Jan. 27, 2025, Server Fabric Adapter for I/O Scaling of Heterogeneous and Accelerated Compute Systems, Sankar, et al.

U.S. Appl. No. 18/747,118, filed Jun. 18, 2024, Optimally Balanced Network Systems, Sankar, et al.

U.S. Appl. No. 17/836,532, filed Jun. 9, 2022, Transparent Remote Memory Access Over Network Portocol, Norrie, et al.

U.S. Appl. No. 18/755,372, filed Jun. 26, 2024, Transparent Remote Memory Access Over Network Protocol, Norrie, et al.

U.S. Appl. No. 18/102,033, filed Jan. 26, 2023, System and Method for One-Sided Read RMA Using Linked Queues, Mukherjee, et al.

U.S. Appl. No. 18/107,324, filed Feb. 8, 2023, System and Method for Using Dynamic Thresholds With Route Isolation for Heterogeneous Traffic in Buffers, Aravinthan, et al.

U.S. Appl. No. 18/447,180, filed Aug. 9, 2023, System and Method for Ghost Bridging, Norrie, et al.

U.S. Appl. No. 19/046,232, filed Feb. 5, 2025, System and Method for Ghost Bridging, Norrie, et al.

U.S. Appl. No. 18/666,548, filed May 16, 2024, System and Method for an Optimized Staging Buffer for Broadcast/Multicast Operations, Mukherjee, et al.

U.S. Appl. No. 18/526,727, filed Dec. 1, 2023, A Modular Datacenter Interconnection System, Skirrnont, et al.

U.S. Appl. No. 18/785,542, filed Jul. 26, 2024, Method and System for Tracking and Moving Pages Within a Memory Hierarchy, Mukherjee, et al.

U.S. Appl. No. 18/920,558, filed Oct. 18, 2024, System and Method for Optimally Balanced Network Multipathing, Shrijeet Mukherjee, et al.

U.S. Appl. No. 19/034,371, filed Jan. 22, 2025, Input/Output System Interconnect Redundancy and Failover, Frederic Vecoven, et al.

Extended European Search Report for European Patent Application No. EP 22856810.1, dated May 30, 2025 (9 pages).

European Search Report for European Patent Application No. EP 22737124.2, dated Jan. 23, 2025 (6 pages).

Partial European Search Report for European Patent Application No. EP 22821030.8, dated Apr. 9, 2025 (15 pages).

International Search Report and Written Opinion for International Patent Application No. PCT/US2024/052073, dated Apr. 28, 2024 (16 pages).

International Search Report and Written Opinion for International Patent Application No. PCT/US2025/012514, dated Jul. 30, 2025 (11 pages).

* cited by examiner

SYSTEM AND METHOD FOR CONGESTION CONTROL USING A FLOW LEVEL TRANSMIT MECHANISM

CROSS REFERENCE TO RELATED APPLICATION

This application claims the benefit of priority to U.S. Provisional Patent Application No. 63/232,078, filed Aug. 11, 2021, the entire contents of which are incorporated by reference herein.

TECHNICAL FIELD

This disclosure relates to a congestion control system that provides a fast reaction of a source device to slow down data transmission rate, thereby reducing network buffer occupancy and relieving congestion.

BACKGROUND

Network congestion occurs when too many packets are present in a network so that the network cannot adequately handle the traffic flowing through it. When congestion occurs, it slows down the network response time and degrades the network performance. However, the ability to drive a high-performance network at a maximum rate, without packet drops, packet re-transmissions, and other disruptive patterns, is valuable to many entities including data centers of different sizes.

Current congestion control techniques have some shortcomings. In prior systems, segment offloading is often applied to reduce the processing overhead of receiving host's CPU, which, however, may create microbursts to overflow packet buffers of switches (e.g and/or cause packet/segment drops. Another congestion relief may include priority-based flow control (PFC). When congestion is caused by a flow of a class of service (CoS) on a link or connection path, PFC does not pause flows from other CoS classes. However, PFC causes all flows of the same CoS group on each link/path to pause. Therefore, instead of providing relief, such excessive pausing may spread congestion through the network to cause network-wide deadlocks. Explicit congestion notification (ECN) may also be used in congestion control. ECN allows a receiver to notify a sender to decrease the transmission rate when congestion occurs. However, in typical implementations, since the congestion point marks packets and relies on the receiver of the marking to send a Congestion Notification to the sender in the opposite direction, ECN responses tend to be slow and imprecise because it may take a long time for the sender to receive a congestion notification and find a way to throttle the flow, while in the meantime the traffic keeps flowing at a full rate and overwhelming the receiver.

SUMMARY

To address the aforementioned shortcomings, a system for congestion control using a flow level transmit mechanism is disclosed. In some embodiments, the system comprises a source SFA and a receive SFA. The receive SFA is configured to generate a congestion notification packet (CNP) when it's receive queues start filling up. The source SFA detects and classifies a CNP generated based on congestion in a network; selects a receive block from a plurality of receive blocks based on the CNP; forwards the CNP to a dedicated congestion notification queue of the receive block; identifies a transmit queue from a plurality of transmit blocks based on processing the congestion notification queue, wherein the transmit queue originated a particular transmit flow causing the congestion; and stops the transmit queue for one or more round trip time (RTT).

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles, and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similarly or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Congestion is an important issue that can arise in packet-switched networks. It slows down the network response time and/or leads to packet drops and retransmissions (e.g., in heavy congestion), thereby decreasing the network performance. The common causes of network congestion may include over-subscription, misconfiguration or poor design of a network, over-utilized devices, faulty devices, security attacks, etc. For example, when an ingress/input traffic rate exceeds an egress/output handling capacity, a communication channel or path of the network may get choked to generate congestion. The congestion may also happen when switches/routers are too slow to execute queuing buffers, refreshing tables, etc.

The present disclosure provides a system and method for congestion control using a flow level transmit control mechanism. Specifically, the present system provides simple rate management solutions and adds a powerful ability to prevent network elements from producing data traffic in the conditions that would lead to a packet drop. Advantageously, the present system allows networks to operate in a manner close to the maximum capacity along with temporal and temporary over-subscription (i.e., the oversubscription lasting for a limited time or having an expiration date). The present system is particularly advantageous as it allows standard reliable transports such as transmission control protocol (TCP) to continue to operate without using very expensive high-resolution timers at high data rates, while in the meantime providing an explicit signal at the hardware level about the rate and state of congestion along network paths.

Existing Congestion Control Approaches

Figure 1:
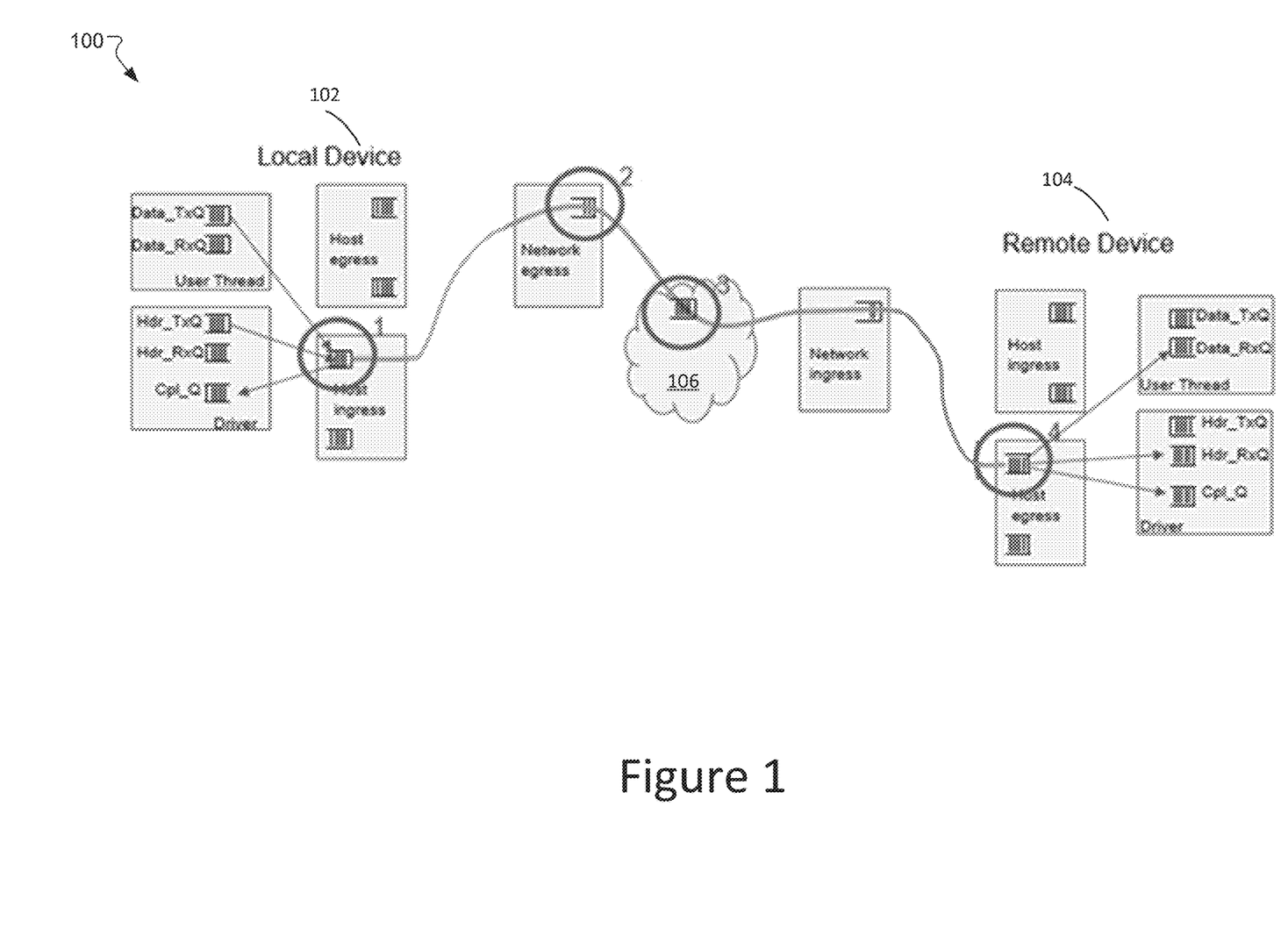
FIG. 1 illustrates an example block diagram of devices interconnected through a cloud network used in prior art architectures, according to some embodiments.

FIG. 1 illustrates an example block diagram 100 of devices interconnected through a cloud network used in prior art architectures, according to some embodiments. In this example, a local device (e.g., device 102) connects with a remote device (e.g., device 104) via at least one cloud network 106. Each of local device 102 and remote device 104 may include user threads, drivers, host ingress memory, and host egress memory, and the devices 102, 104 are communicatively coupled with each other via at least one network switch that has both ingress and egress capabilities. A user thread is a lightweight process handled in user space, which may be controlled by an application and shares address spaces, data/code segments, etc., with peer threads. A driver is a software program that controls a hardware device. The host ingress/egress memory in connection with at least one network switch may buffer, queue, and transmit data associated with the user threads between the devices.

As depicted in FIG. 1, on the local device 102, the application data flows that run on a number of user threads are mapped to software queues in host ingress memory (e.g., host ingress queues) at step 1. Each data packet of the application data flows is then sent to an ingress port of a connecting switch (not shown), where the switch forwards the packet to a network egress port leading towards the packet's destination at step 2. This switch may communicate with another switch in the far end via the cloud network 106 as shown in step 3, and cause each packet to be delivered to its destination host via the corresponding host egress port at step 4. In some embodiments, the underlying switching/routing architecture and implementation provide both bandwidth fairness and congestion isolation for all devices connected to the ports of the switch(s).

The system in FIG. 1 implements session-level flow control using TCP or a similar transport protocol. TCP is a transport protocol that is used on top of internet protocol (IP) to ensure reliable transmission of packets. TCP includes mechanisms to solve many problems that arise from packet-based messaging, such as lost packets, out-of-order packets, duplicate packets, and corrupted packets.

Segmentation offload refers to offloading work of segmenting application data to a network card, reducing the CPU overhead and increasing network throughput. Typical segmentation offload includes TCP segmentation offload (TSO) or generic segmentation offload (GSO). For example, TSO relies on a network interface controller (NIC) to segment application data and then add the TCP, IP and data link layer protocol headers to each segment for transmission. In existing systems, segmentation offloads may create microbursts. That is, the host scheduling on local device 102 is not granular enough nor is it able to determine buffering capabilities of connecting switches, and, thus, may overwhelm switches by delivering bursts that are too long. However, the data bursts, e.g., a significant amount of queued packets delivered within a short time, may cause network buffers to overflow (resulting in packet loss), or may cause latency and jitter issues when network processors further down the line deliver the stored packets. In other words, in the example of FIG. 1, the data bursts may cause congestion in the connecting switch (e.g., in the network) and may further lead to dropped packets/segments. In addition, incast and buffer contention anywhere in the network cloud may compound or worsen the problem of dropped packets/segments. Incast occurs frequently in datacenter networks where a large number of senders send data to a single receiver simultaneously, which makes the last hop the network bottleneck. For example, the TCP incast may suffer from the throughput collapse problem, as a consequence of TCP retransmission timeouts when the bottleneck buffer is overwhelmed and causes packet losses. Furthermore, a slow receiver at the receive queue of remote device 104 may not fill buffers fast enough to prevent packet/segment drops.

Priority-based flow control (PFC) is a lossless transport and congestion relief feature. It allows network flows to be grouped into priority classes and provides link-level flow control over the flow of each class on a full-duplex Ethernet link. Each class is of a class of service (CoS), and each CoS represents a priority according to the IEEE 802.1p code point. While the priority levels of CoSs (e.g., eight priorities) enable some level of differentiation and resource isolation between applications/user threads generating the data flows, these priority classes do not support the granularity level and scale level required by modern computing system deployments (e.g., hundreds of CPU cores/threads, running thousands of application network flows).

When the receive buffer on a switch interface fills to a threshold, the switch transmits a pause frame to the sender (e.g., the connected peer, local device 102 in FIG. 1) to temporarily stop the sender from transmitting more frames. In this scenario, the receive buffer's threshold must be low enough so that the sender (e.g., local device 102) has time to stop transmitting frames and the receiver (e.g., remote device 104) can accept the frames already on the wire before the buffer overflows. In some embodiments, the switch automatically sets queue buffer thresholds to prevent frame loss.

Using PFC, when congestion forces one priority on a link or connection path (e.g., a flow of a particular CoS on the link) to pause, all the other priorities on the link (e.g., flows of other CoS groups) continue to send frames. Only frames of the paused priority or CoS group are not transmitted. When the receive buffer is emptied below another threshold, the switch sends a message that starts the flow again. PFC is however a blunt instrument. All flows that are in the same COS group will experience the pause. Since each link needs a pause signal to prevent the dropping of packets and PFC lacks the granularity to identify the particular flow of the particular CoS that caused the congestion, all the flows of the same CoS on each link are paused. In other words, even if a single MC may be the source of traffic that triggers a PFC generation event for a given CoS class, a PFC notification will penalize all NICs for the given CoS class. Because of this wide-range data pause and the amount of data traffic on a link or assigned to a priority, pausing the traffic may cause ingress port congestion and further spread the congestion through the network, thereby leading to more damage than providing relief (e.g., causing network wide deadlocks).

Explicit congestion notification (ECN) enables end-to-end congestion notification between two endpoints on TCP/IP based networks. ECN is a feedback scheme that indicates congestion information by marking packets instead of dropping the packets. Upon detecting congestion, one or more network devices (e.g., switch) may mark the packets using an ECN field in the IP heads (e.g., with two specific bits). When the marked packets arrive at the intended destination, the receiver/destination of the marked packets may return a congestion notification to the sender/source. In response to the congestion notification, the sender then decreases the data transmit rate.

The two endpoints are an ECN-enabled sender and an ECN-enabled receiver. ECN must be enabled on both endpoints and on all the intermediate devices between the endpoints for ECN to work properly. Any device in the transmission path that does not support ECN cannot provide information about congestion and thus breaks the end-to-end ECN functionality.

Datacenter center quantized congestion notification (DCQCN) is a combination of ECN and PFC to support end-to-end lossless Ethernet. ECN helps overcome the limitations of PFC to achieve lossless Ethernet. The idea behind DCQCN is to allow ECN to perform flow control by decreasing the transmission rate when congestion starts, thereby minimizing the time PFC is triggered. DCQCN ensures that PFC is not triggered too early or too late. That is, PFC should not start before ECN has a chance to send congestion notification(s) to slow the flow and PFC cannot start too late to cause packet loss due to buffer overflow. ECN and PFC stop the flow altogether.

ECN samples packets when buffers fill up and statistically picks packets to notify the receiver (e.g., remote device 104) about congestion to reduce packet loss and delay. The receiver or remote device 104 then reflects the notification to the sender or local device 102, and local device 102 then decreases the transmission rate until the congestion clears, without dropping packets. However, in typical implementations, ECN responses tend to be slow and imprecise because the sender will not make a change until the sending software has received the congestion notification packet from the receiver and throttled the flow. It may take a long time before the sender's response to the ECN mark can be seen, while in the meantime the traffic is still flowing at a full rate and overwhelming the receiver.

Improved Flow Control

Figure 2:
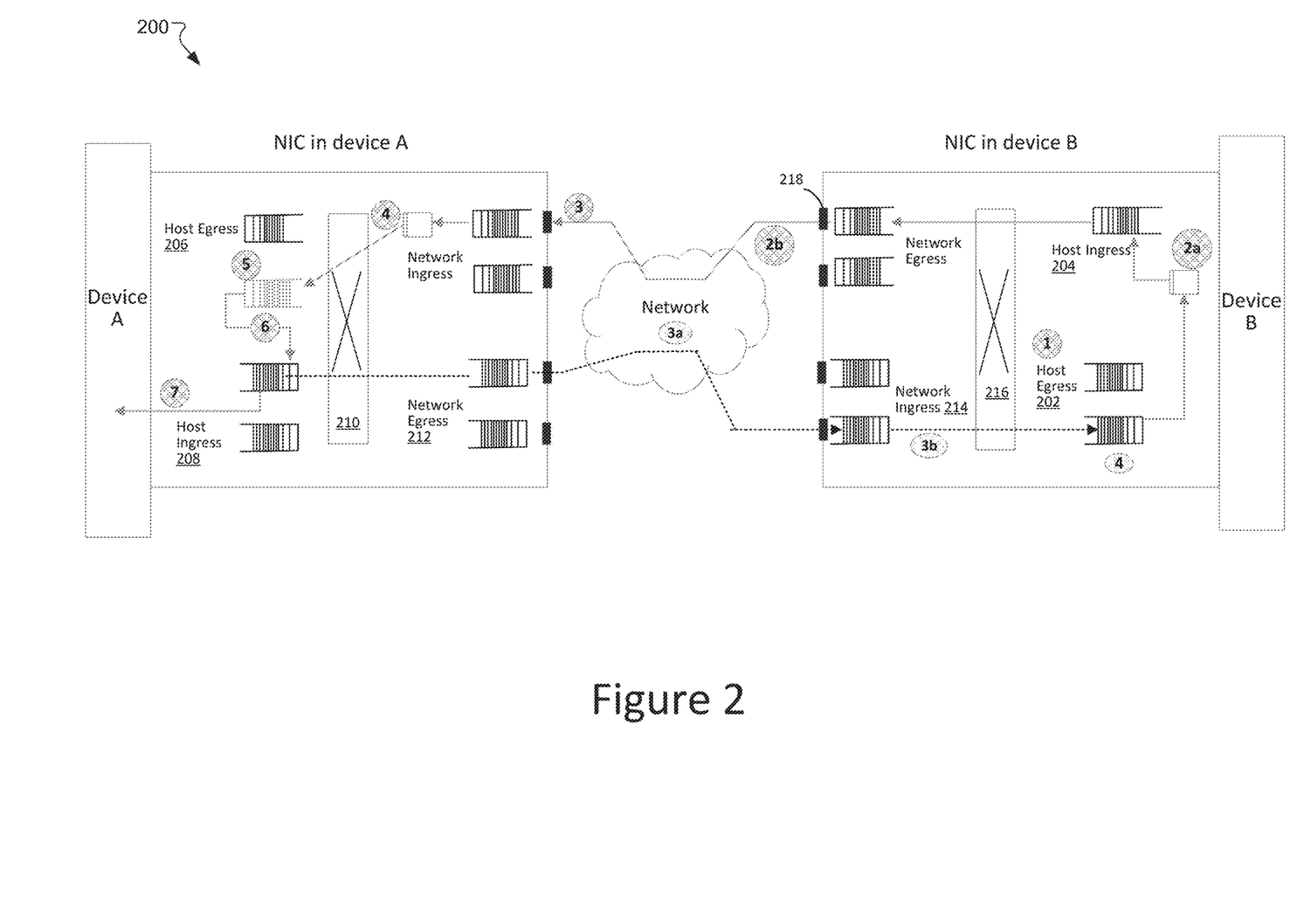
FIG. 2 illustrates an example system that performs improved flow control, according to some embodiments.

FIG. 2 illustrates an example system 200 that performs improved flow control, according to some embodiments. System 200 provides an effective sub-microsecond negative/no acknowledgment (NACK) to prevent overrun. The overrun occurs when the packets are discarded because of a temporary overload in the network. As compared to prior congestion control systems, system 200 improves the TCP window based flow control (or any similar flow control scheme) to provide fast reactions. In some embodiments, the present system 200 may improve the prior TCP reaction times by aggressively slowing down the sender/source device's transmit engines in response to receiving one or more ECN signals from the network or upon identifying congestion in the receiver device queues. In some embodiments, system 200 may allocate the resources to track individual connection states. Based on the connection state, system 200 may cause the receiver queues and/or other internal forwarding queues of a receiver/receiving device to generate and send at least one congestion notification signal (e.g., a congestion notification packet). In response to that, at least one congestion notification signal, system 200 may notify the sender/source device to slow down the data transmission to resolve the congestion.

Figure 3:
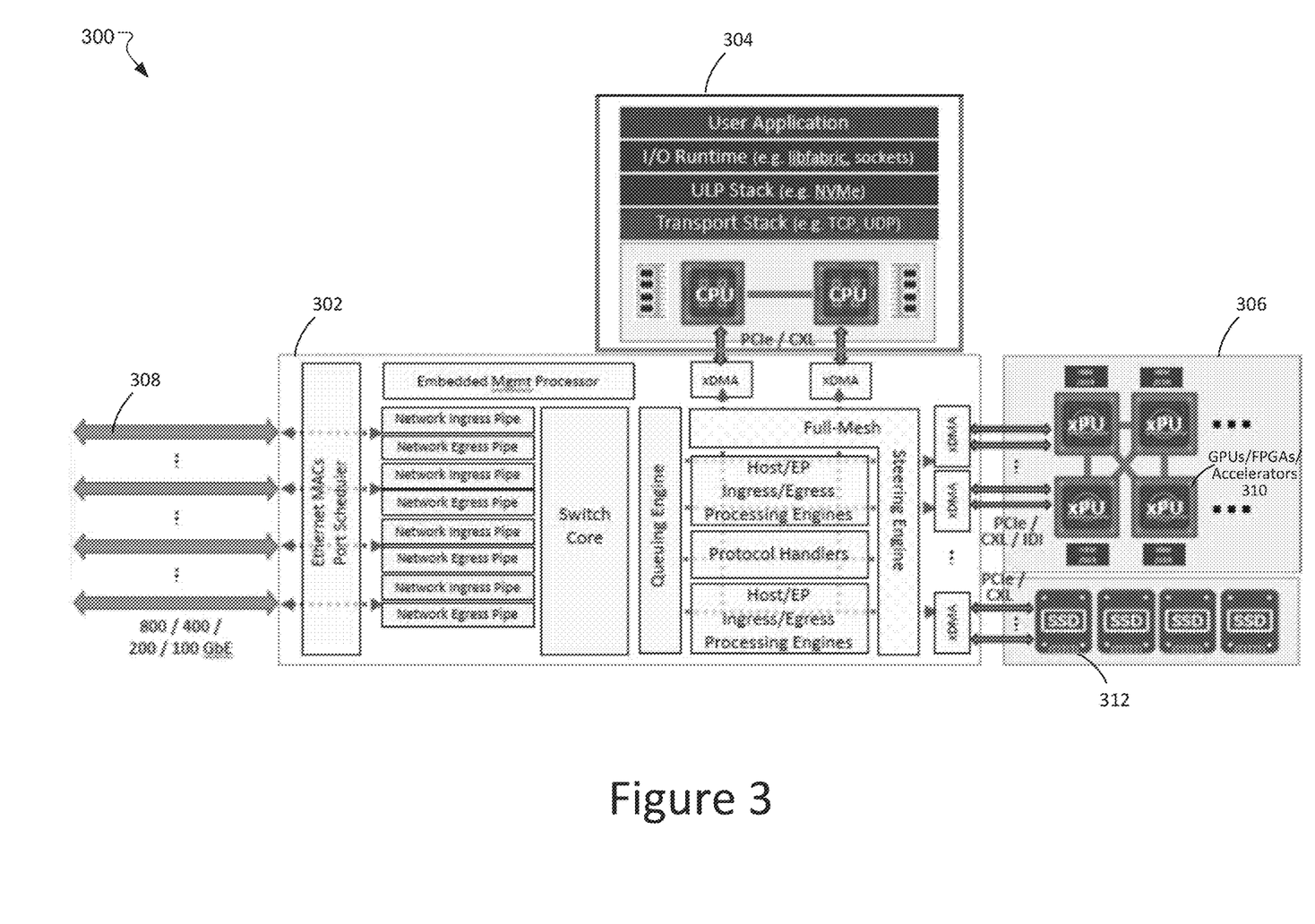
FIG. 3 illustrates an exemplary server fabric adapter architecture for accelerated and/or heterogeneous computing systems in a data center network, according to some embodiments.

System 200 is advantageous in other aspects. Since system 200 is built upon the standard ECN/DCQCN frameworks, it can use the standard fabric and resource management tools to operate (e.g., a server fabric adapter system). An example system fabric is shown in FIG. 3. In addition, system 200 may leverage standard configuration mechanisms of using reserved buffers, class of service (COS) queues, and weighted random early detection (WRED) to signal congestions. The present system 200 may further use hardware to create a signal-to-flow affinity and act aggressively on behalf of software.

Device A and device B are communicatively connected over network(s). In the example of FIG. 2, device A acts as a sender/source device to transmit data to device B that acts as a receiver/receiving device. Each device has a network interface card (NIC) that is configured to implement the congestion control process as depicted in FIG. 2. In some embodiments, devices A and B may be implemented using server fabric adapter (SFA) architecture as shown below in FIG. 3.

The example congestion control process in FIG. 2 includes several stages (e.g., as indicated by the circled reference numerical). In stage 1, when receiving the data sent from source device A (e.g., source SFA), the receive processing engine (e.g., host egress processing engine 202) of receiving device B (e.g., receive SFA) may detect a packet backup or ECN notification. A packet backup occurs when a host receiving buffer (e.g., the host egress engine 202 in device B) is not processing the intended packets fast enough, or when device buffers (e.g., in device B or an intermediate device) are temporarily exhausted, or when queue schedulers cannot schedule the data load (e.g., when a timeout happens due to the number of active flows). Both packet backup and ECN notification indicate the occurrence of congestion. The receive/host egress processing engine 202 may then send a notification to a transmit processing engine (e.g., host ingress processing engine 204) with flow information. The example flow information, such as the connection header and a unique hash that is computed over the header, are described in Table 1 below.

In stage 2, upon receiving the congestion notification, the transmit/host ingress processing engine 204 generates and sends out a congestion notification packet. In some embodiments, the congestion notification packet is a flow control transmit off (FL_XOFF) packet. The transmit/host ingress processing engine 204 looks up one or more preallocated tables configured for the network egress queue and dispatches the pre-configured FL_XOFF packet to the network egress queue for transmitting to a network through a network port 218. In some embodiments, the FL_XOFF packet is a user datagram protocol (UDP) packet sent to a reserved destination port (DPort). The FL_XOFF packet is harmless to a server (2b) in the network that does not understand it and thus can safely be routed to device A. A CNP is generated from a properly equipped receiver, but it may be sent to a sender (e.g., device A) that does not know how to handle the CNP in hardware. In such cases, e.g., the UDP port is not tracked in hardware, this CNP will be treated as a standard UDP packet delivered to the sender, where the host software (rather than the hardware) in the sender will act on the CNP.

The FL_XOFF packet includes the information that allows routing to device A (e.g., source machine, sender) for determining the particular transmit flow that needs to be turned off (e.g., XOFF'ed). In some embodiments, the FL_XOFF packet includes an exponential backoff time, to signal persistent or expanding congestion. That is, the exponential backoff time is only allowed to increment after a specific time amount (e.g., one round trip time (RTT) has expired) and congestion has increased. The exponentially increased backoff time allows the data flow rate from the sender to be gradually, multiplicatively decreased until an acceptable data flow rate. In some embodiments, to ensure that the FL_XOFF packet is directed to the correct transmit block on device A for turning off the particular transmit flow, the packet may include a hash that can be looked up on device A. Device A is expected to fill in a table such that the index at the connection hash value points to an appropriate receive block. A transmit block is responsible for sending the packet from the source device, and a receive block is responsible for receiving the packet at the receiver device. For example, the transmit block may include the host ingress 208, switch portion 210, and network egress 212 in device A, and the receiver block may include the network ingress 214, switch portion 216, and host egress 202 in device B. Since these hashes are based on the connection/header information, they can be computed without control plane message exchange. In other words, the sender and the receiver (e.g., devices A and B) do not need to exchange any setup protocol information to establish a communication between them, although the use of control plan message is not excluded.

In some embodiments, instead of turning off the entire transmit flow, a signal may be generated to decrease the transmit rate of the particular transmit flow. For example, the burst count field (as shown in below Table 1) may be configured to change the amount/quantum of data to be allowed.

The FL_XOFF packet may also carry information to identify the target receive processing engine (e.g., host egress processing engine 206) at device A. For example, the hash included in the FL_XOFF is used to identify the receive processing engine, which in turn identifies the transmitting queue that needs to be throttled. Depending on various embodiments of implementation, device A may include multiple host egress/ingress engines, or associate each host egress/ingress engine with multiple network cards. Irrespective of the implementation architecture, a FL_XOFF packet may be received by one of many receive queues and is used to signal one of many transmit queues to stop. In response to receiving the FL_XOFF packet, the receive/host egress processing engine 206 may use the hash information included in the packet to determine the specific transmit queue that has originated the particular flow and thus needs to be turned off or XOFF'ed. This functionality is therefore similar to the PFC scheme, but provides the ability to stop a specific flow rather than stopping a COS class that aggregates all flows in that class as in PFC. An example UDP FL_XOFF packet is shown below in Table 1.

In stages 3-7, upon receiving the UDP FL-XOFF packet, device A may take actions, e.g., identifying and stopping the particular transmit flow, to reduce the data transmission rate and thus control the congestion. In stage 3, the ingress parser (not shown) detects the FL_XOFF packet and routes it to a pre-allocated table. In some embodiments, this hash table provides a lookup that converts a flow_hash into a local receive processing engine/block index. The flow_hash may be computed based on the connection header representing the connection from a port in device A to a port in device B. For example, the connection header may be a TCP 5-tuple, which includes/represents a TCP/IP connection with values of a source IP address, a source port number, a destination address, a destination port, and the protocol. Device A only needs to fill in entries of the hash table at entry "function (connection_header)" to obtain the flow_hash or hash that represents the connection. Once the hash is computed, the fl_xoff packet will also include this hash such that a correct action can be taken for the FL_XOFF packet for the flow. The table allows for the selection of a particular receive block (e.g., host egress block) for each packet. In stage 4, the table is looked up to determine a receive/host egress block for the received FL-XOFF packet. The FL_XOFF packet is then forwarded to the selected receive (e.g., host egress) block fl_xoff queue. For device A, a FL_XOFF packet is received by one of the receive engines/queues; however, it is one particular transmitting queue of the transmitting queues that needs to be stopped. Therefore, when packets are received in device A, the FL_XOFF packet is first isolated to avoid head of line blocking, and then the header information in the isolated FL_XOFF packet is used to signal the particular transmit queue as part of receive processing of the packet. Such processing in stage 4 and 5 is simple and deterministic due to the use of the hash included in the headers of the FL_XOFF packet.

In some embodiments, as shown in the dashed path 3a, 3b, and 4, an overloaded sender and/or internal forwarding queue may generate the CNP, and the CNP is routed back to device A to stall the data transmission. In particular, any congestion between device A and an connecting switch (e.g., shown in the network of 3a) may be handled using the same CNP mechanism as described above.

Moving to stage 5, the receive/host egress block fl_xoff queue is processed at the highest priority to identify the transmit queue (TxQ) in one of the transmit blocks. The priority is coded in a time critical signal so it is processed with a higher priority than other network traffic. The hash tables include pointers that are indexed by the hash of the header. Each hash is computed when the connection is established. The transmit queue is identified based on the lookup of these hash tables. This indirection allows the receive processing engine e.g., host egress processing engine 206) that gets FL_XOFF packets to signal the appropriate transmit block in response to receiving a FL_XOFF packet.

In some embodiments, in stage 6, the selected transmit queue (TxQ) gets de-scheduled from a transmit scheduler and starts the round trip time (RTT). The RTT is a software programmed value. In some embodiments, the RTT may diverge from the real round trip time in network transmission if needed. The real round trip time is a duration it takes for a network request to be sent and an acknowledgment of the request to be received. The RTT may be periodically updated by the transport stack. The selected transmit queue, from which the particular flow that has caused congestion originated, is therefore turned off for the duration of one RTT. In other words, once the selected transmit queue is de-scheduled, no data in this queue will be moved or transmitted for at least a RTT time. After RTT timeout the system, in stage 7, will automatically enable the TxQ to be restarted unless an exponential backoff has been signaled. In some embodiments, for each FL_XOFF packet, a completion signal is also generated and sent to inform the software stack that a particular TxQ is being requested to be throttled.

In some embodiments, the present system (e.g., system 200 in FIG. 2) has per connection receive queues (RxQs)

and transmit queues (TxQs). In such a case, the RxQs are tracked for the fullness of the data buffers. If the RxQs are shared, these queues would share the buffer fullness information. However, if the system does not support per connection receive and transmit queues, the completion can be used to do software per flow throttling and still use the hardware features of device B to detect the backup conditions. That is, the FL_XOFF packet information can be sent to the software stack on device A, and the software stack can use the hash to identify the particular flow to be throttled when device A cannot perform per flow throttling using the hardware.

The present system determines to generate and send the congestion notification packet (CNP) (e.g.,) based on one or more trigger conditions. A trigger condition may be a underflow/underrun of buffer submission rate in receiver buffers/queues, where a slow receiver is not filling empty buffers fast enough to land the incoming packet data. In some embodiments, each receive queue (e.g., in device B) has a corresponding pre-allocated CNP. When a received packet is determined to be for a receive queue, and the data buffer capacity is about to underrun, the CNP is automatically generated and sent out by the hardware. Alternatively, if an ECN notification signal is detected for the flow, the CNP is also fired automatically by the hardware. The CNP packet is similar to an extended ECN notification, and so, a new UDP-based packet (e.g., FL_XOFF packet) is chosen to ensure network delivery. Optionally, the CNP may also include the information reflecting the available depth of data buffers, and the CNP is sent out periodically.

Alternatively or additionally, a trigger condition may include transmit port congestion (e.g., in device A). Similar to handling receive queue (RxQ) buffer underruns, if the network transmit path is blocked, a CNP packet will be generated locally to indicate the network congestion.

In some embodiments, the present system is implemented in hardware. In other embodiments, one or more components of the system may be implemented in software. For example, packets from device AB destined to device B/A may originate from a software component.

The present system uses reserved packet queues for CNPs. On the remote device (e.g., device B) side, the CNP is emitted through dedicated queues in the network transmit processing engine (not shown in FIG. 2). On the local device (e.g., device A) side, the CNP is ingested through dedicated queues in a network receive path. In some embodiments, the queues are optimized to handle shallow, small packets at a high burst rate. These queues are dedicated and specifically configured to allow that the CNPs can be processed at the highest priority, thereby ensuring the fast reactions of the source device (e.g., device A).

A trigger transmit off (X_OFF) signal is used to turn off/stop the particular flow that originated from a transmit queue (TxQ) and caused the congestion. In some embodiments, a CNP packet received on the receive (e.g., host egress) block signals the associated TxQ direct memory access (DMA) to stop. Because the CNP indicates the existence or prediction of congestion, the reaction in Tx is immediate. The CNP or FL_XOFF signaling does not need to persist but can be repeated. In some embodiments, the local device (e.g., device A) is allowed to ignore a FL_XOFF signal for at most the duration of the current connection RTT. The RTT is updated periodically by software. No acknowledgment to the originator of the CNP (e.g., device B) is needed because the FL_XOFF packets are UDP packets. If the CNPs are repeated in the RTT window, then the packets are ignored. When the CNPs are lost, packet loss will occur; however, TCP will recover the system.

In some embodiments, the transmission is returned based on a timed wait approach. For example, the present system may not re-enable TxQ DMA until one RTT has lapsed. In other embodiments, the present system may re-enable the transmission using a reduced rate trigger, where the particular TxQ drops out of a transmission group in scheduling priority until the CNP stops signaling. As a result, a subsequent doorbell write, after a timeout, then enables the particular transmit queue again.

In short, a TxQ that caused congestion may be identified in device A in response to receiving a CNP, e.g., from device B (as in 2a, 2b) and/or from an internal switch (e.g., as in 3a, 3b). Once the TxQ is identified, device A stops the data transmission in the TxQ for one RTT. After the one RTT, the data transmission in the TxQ will be re-enabled, e.g., based on timed wait or using a reduced rate trigger, unless additional CNP(s) with exponential backoff time value(s) arrived in device A within the RTT. An CNP after the RTT will trigger the TxQ to be de-scheduled and stopped again.

Example Congestion Notification Packet

Table 1 below illustrates an exemplary CNP or FL_XOFF UDP packet, according to some embodiments.

TABLE 1

| UDP FL_XOFF Packet (CNP) | | | | | | |
|---|---|---|---|---|---|---|
| UDP Network Header | Len | Rev | Steering Cookie (indicates Source TxQ) | Burst Count | Monotonic Time Count | Encapsulated original reverse path network headers |

The example CNP in Table 1 includes at least a UPD header, a steering cookie, a burst count, a monotonic time count, and encapsulated headers.

UDP Header: It is used to route the CNP back to the device that originated the traffic that caused the congestion problem. In some embodiments, the UDP header includes a well-known and reserved destination port;

Steering cookie: For systems where the receiver has out-of-band information about the particular TxQ originating the packets, a pre-programmed steering cookie may be provided to allow the ingress classifier of the source device (e.g., device A in FIG. 2) to identify the particular TxQ. In some embodiments, the steering cookie can be pre-exchanged or preferably a hash computed using the connection tuple information;

Burst count: For every set of XOFF packets generated from the same event (e.g., congestion event), an increasing number is configured to allow the TxQ to use exponential backoff in terms of RTT. If congestion persists beyond one RTT, the counter is incremented and leads to an exponential backoff on the TxQ scheduler;

Monotonic time count: A free running counter in the receiver is used to generate a time count. Any time count received outside the current window will be discarded. A window is defined as a range from the last received time count and a certain count ahead, where the count ahead may include a wrap-around time; and Encapsulated headers: This allows the receiver to forward the XOFF packet internally as if it was a reverse path packet for the connection and identify the TxQ using existing classification and steering rule.

Implementation System

FIG. 3 illustrates an exemplary server fabric adapter architecture 300 for accelerated and/or heterogeneous computing systems in a data center network. The server fabric adapter (SFA) 302 of FIG. 3 may be used to implement the flow control mechanism as shown in FIG. 2. In some embodiments, SFA 302 may connect to one or more controlling hosts 304, one or more endpoints 306, and one or more Ethernet ports 308. An endpoint 306 may be a GPU, accelerator, FPGA, etc. Endpoint 306 may also be a storage or memory element 312 (e.g., SSD), etc. SFA 302 may communicate with the other portions of the data center network via the one or more Ethernet ports 308.

In some embodiments, the interfaces between SFA 302 and controlling host CPUs 304 and endpoints 306 are shown as over PCIe/CXL 314a or similar memory-mapped I/O interfaces. In addition to PCIe/CXL, SFA 302 may also communicate with a GPU/FPGA/accelerator 310 using wide and parallel inter-die interfaces (IDI) such as Just a Bunch of Wires (JBOW). The interfaces between SFA 302 and GPU/FPGA/accelerator 310 are therefore shown as over PCIe/CXL/IDI 314b.

SFA 302 is a scalable and disaggregated I/O hub, which may deliver multiple terabits-per-second of high-speed server I/O and network throughput across a composable and accelerated compute system. In some embodiments, SFA 302 may enable uniform, performant, and elastic scale-up and scale-out of heterogeneous resources. SFA 302 may also provide an open, high-performance, and standard-based interconnect (e.g., 800/400 GbE, PCIe Gen 5/6, CXL). SFA 302 may further allow I/O transport and upper layer processing under the full control of an externally controlled transport processor. In many scenarios, SFA 302 may use the native networking stack of a transport host and enable ganging/grouping of the transport processors (e.g., of x86 architecture).

As depicted in FIG. 3, SFA 302 connects to one or more controlling host CPUs 304, endpoints 306, and Ethernet ports 308. A controlling host CPU or controlling host 304 may provide transport and upper layer protocol processing, act as a user application "Master," and provide infrastructure layer services. An endpoint 306 (e.g., GPU/FPGA/accelerator 310, storage 312) may be producers and consumers of streaming data payloads that are contained in communication packets. An Ethernet port 308 is a switched, routed, and/or load balanced interface that connects SFA 302 to the next tier of network switching and/or routing nodes in the data center infrastructure.

In some embodiments, SFA 302 is responsible for transmitting data at high throughput and low predictable latency between:
Network and Host;
Network and Accelerator;
Accelerator and Host;
Accelerator and Accelerator; and/or
Network and Network.

In general, when transmitting data/packets between the entities, SFA 302 may separate/parse arbitrary portions of a network packet and map each portion of the packet to a separate device PCIe address space. In some embodiments, an arbitrary portion of the network packet may be a transport header, an upper layer protocol (ULP) header, or a payload. SFA 302 is able to transmit each portion of the network packet over an arbitrary number of disjoint physical interfaces toward separate memory subsystems or even separate compute (e.g., CPU/GPU) subsystems.

By identifying, separating, and transmitting arbitrary portions of a network packet to separate memory/compute subsystems, SFA 302 may promote the aggregate packet data movement capacity of a network interface into heterogeneous systems consisting of CPUs, GPUs/FPGAs/accelerators, and storage/memory. SFA 302 may also factor, in the various physical interfaces, capacity attributes (e.g., bandwidth) of each such heterogeneous systems/computing components.

In some embodiments, SFA 302 may interact with or act as a memory manager. SFA 302 provides virtual memory management for every device that connects to SFA 302. This allows SFA 302 to use processors and memories attached to it to create arbitrary data processing pipelines, load balanced data flows, and channel transactions towards multiple redundant computers or accelerators that connect to SFA 302. Moreover, the dynamic nature of the memory space associations performed by SFA 302 may allow for highly powerful failover system attributes for the processing elements that deal with the connectivity and protocol stacks of system 300.

Flow Diagrams of Memory Request Processing using SFA

Figure 4:
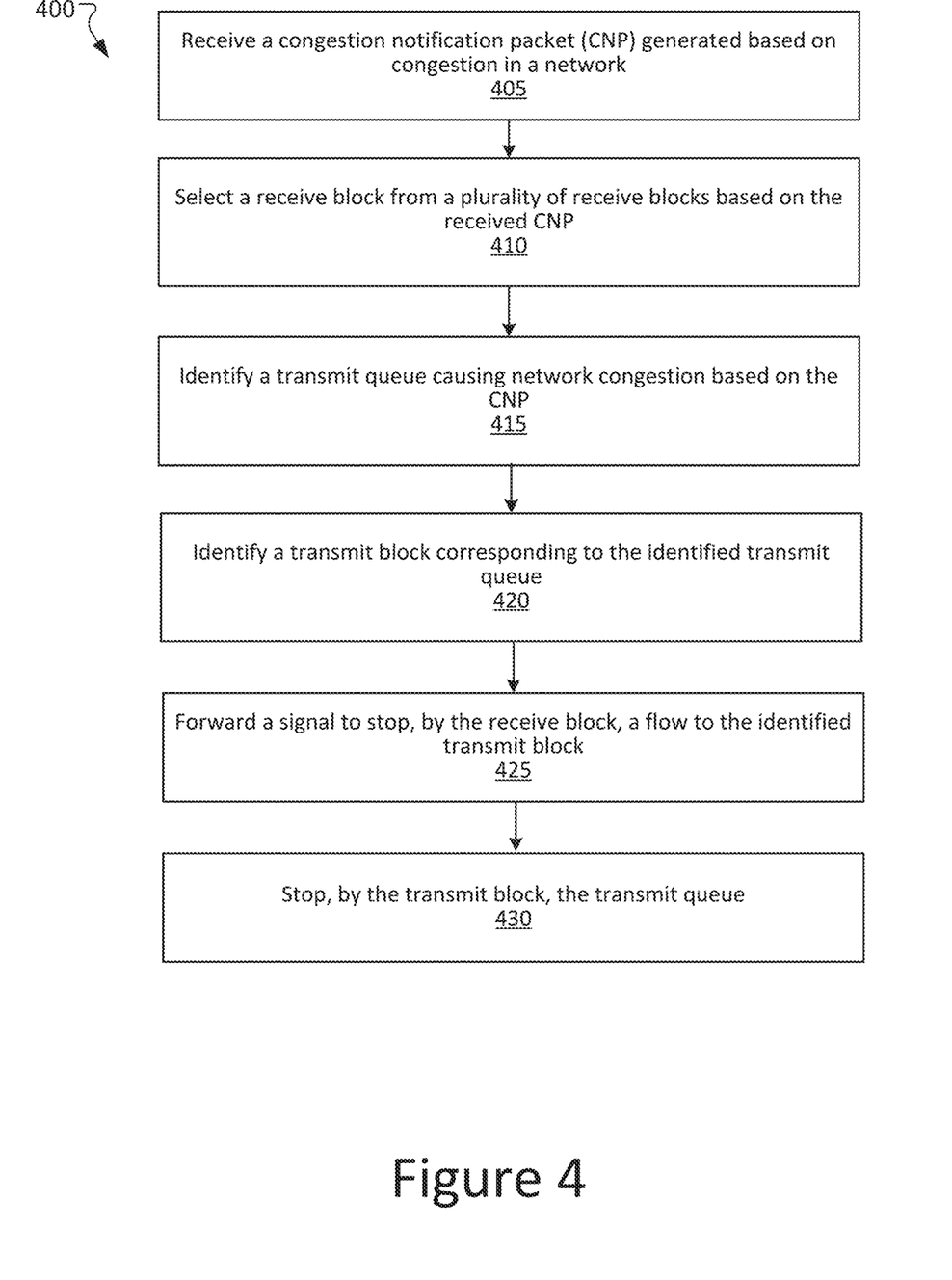
FIG. 4 illustrates an exemplary process of providing fast flow-level congestion control, according to some embodiments.

FIG. 4 illustrates an exemplary process 400 of providing fast flow-level congestion control, according to some embodiments. Process 400 is implemented by a source device. A source device and a receiving device are communicatively connected over network(s). In the example of FIG. 2, device A acts as the source device to transmit data to device B that acts as the receiving device. Process 400 is implemented from the perspective of the source device.

At step 405, a congestion notification packet (CNP) generated based on congestion in a network (e.g., by the receiving device) is received by the source device. In response to receiving the CNP, at step 410, the source device selects a receive block from a plurality of receive blocks based on the received CNP. The source device then identifies a transmit queue causing network congestion based on the CNP at step 415 and identifies a transmit block corresponding to the identified transmit queue at step 420. In some embodiments, the FL_XOFF packet includes the information that allows routing to the source SFA for determining the particular transmit flow that needs to be turned off (e.g., XOFF'ed). This information may include a hash that can be looked up on the source SFA. Upon detecting the FL_XOFF packet, the source SFA looks up a pre-allocated table to convert the hash or flow_hash into a local receive processing engine index and to determine a receive/host egress block for the received FL-XOFF packet. In some embodiments, the flow_hash may be generated based on at least a transport layer (L4) header and an IP (L3) header.

Once the particular transmit queue is identified and transmit block is determined, the source device forwards a signal to stop, by the receive block, a flow to the identified transmit block at step 425, and the transmit block stops the transmit queue at step 430.

Figure 5:
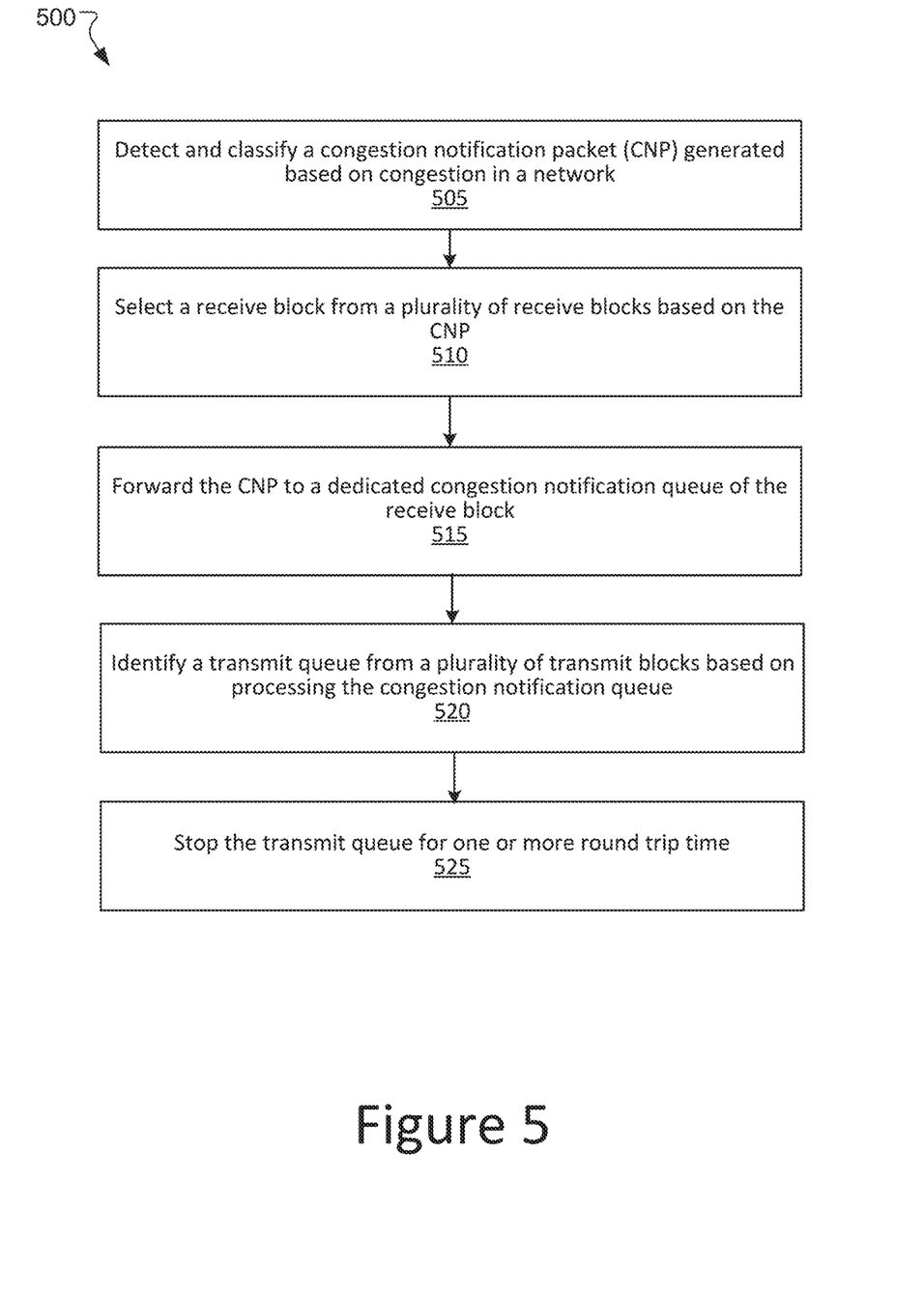
FIG. 5 illustrates an exemplary congestion control process, according to some embodiments.

FIG. 5 illustrates an exemplary process 500 of providing fast flow-level congestion control, according to some embodiments. In some embodiments, an SFA communication system includes an SFA (e.g., SFA 302 of FIG. 3) communicatively coupled to a plurality of controlling hosts, a plurality of endpoints, a plurality of network ports, as well as one or more other SFAs. The one or more SFAs include at least a receive SFA. In the example of FIG. 5, SFA 302 is considered as a source SFA to perform the steps of process 500.

At step 505, a congestion notification packet (CNP) is detected and classified. When the data traffic from the source SFA to the receive SFA is so heavy that it slows down the network response time, a CNP is generated by the receive SFA and transmitted back to the source SFA to notify the source SFA that the congestion occurs. In response, the source SFA is expected to reduce the transmit rate, for example, stop the particular data flow that caused the congestion. In some embodiments, when the receive SFA determines a receive buffer underruns and/or the receive SFA receives an explicit congestion notification, the CNP may be automatically generated by the receive SFA. In other embodiments, when the source SFA determines that a transmit port is congested, the CNP may be automatically generated by the source SFA.

At step 510, a receive block from a plurality of receive blocks is selected based on the CNP. In some embodiments, the CNP is a user datagram protocol (UDP) packet sent to a reserved destination port of the source SFA, i.e., a UDP flow control transmit off (FL_XOFF) packet. At step 515, the CNP is forwarded to a congestion notification queue of the receive block. In some embodiments, the congestion notification queue is a dedicated queue optimized to handle shallow, small packets at a high burst rate.

At step 520, a transmit queue from a plurality of transmit blocks is identified based on processing the congestion notification queue, where the transmit queue originated a particular transmit flow causing the congestion. At step 525, the transmit queue is stopped for one or more round trip time (RTT). In some embodiments, the selected transmit queue gets de-scheduled from a transmit scheduler and starts the round trip time (RTT). The selected transmit queue is therefore turned off for the duration of one RTT. In other words, once the selected transmit queue is de-scheduled, no data in this queue will be moved or transmitted for at least a RTT time. After RTT timeout, the TxQ will be automatically enabled unless an exponential backoff has been signaled.

Additional Considerations

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer-readable medium. The storage device 830 may be implemented in a distributed way over a network, for example as a server farm or a set of widely distributed servers, or may be implemented in a single computing device.

Although an example processing system has been described, embodiments of the subject matter, functional operations, and processes described in this specification can be implemented in other types of digital electronic circuitry, in tangibly-embodied computer software or firmware, in computer hardware, including the structures disclosed in this specification and their structural equivalents, or combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application-specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other units suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory, or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship with each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein are for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for congestion control using a flow level transmit mechanism, the method comprising:
   obtaining, by a source device, a congestion notification packet (CNP) generated based on congestion in a network, the network connecting the source device and a receiving device;
   identifying, by the source device and based on the CNP, a transmit queue in the source device that is causing network congestion;
   identifying, by the source device, a transmit block corresponding to the identified transmit queue; and
   stopping, by the transmit block, the transmit queue for at least one round trip time (RTT), wherein the RTT is a software programmed value and is updated periodically.

2. The method of claim 1, wherein the CNP includes information for determining a flow to be stopped, and wherein the information includes a hash computed based on connection information.

3. The method of claim 2, further comprising:
   converting the hash into a receive processing engine index, wherein the hash and the receive processing engine index are used for identifying the transmit queue.

4. The method of claim 1, further comprising:
   determining, by the receiving device, that a receive buffer associated with the receiving device is experiencing underruns; and
   in response to determining that the receive buffer is experiencing the underruns, automatically generating the CNP by the receiving device.

5. The method of claim 1, further comprising:
   detecting, by the receiving device, an explicit congestion notification (ECN); and
   automatically generating the CNP by the receiving device in response to the ECN.

6. The method of claim 1, further comprising:
   determining, by the source device, that a transmit port in the source device is congested; and
   in response to determining that the transmit port is congested, automatically generating the CNP by the source device.

7. The method of claim 1, wherein the CNP includes an exponential backoff time.

8. The method of claim 1, wherein the CNP is a user datagram protocol packet sent to a reserved destination port of the source device.

9. The method of claim 1, further comprising:
   forwarding, by the source device, the CNP to a congestion notification queue, wherein the congestion notification queue is a dedicated queue optimized to handle shallow, small packets at a high burst rate; and
   processing, by the source device, the congestion notification queue at a highest priority that is assigned using priority-based flow control (PFC).

10. The method of claim 1, further comprising:
    selecting, by the source device and based on the CNP, a receive block from a plurality of receive blocks in the source device; and
    forwarding a signal by the receive block to stop a flow to the identified transmit block,
    wherein stopping the transmit queue by the transmit block is in response to the signal.

11. A server fabric adapter (SFA) communication system comprising:
    a source SFA communicatively couplable to a receive SFA, wherein the source SFA is configured to:
       obtain a congestion notification packet (CNP) generated based on congestion in a network, the network connecting the source SFA and the receive SFA;
       identify a transmit queue from a plurality of transmit queues in the source SFA based on the CNP, wherein the transmit queue originated a flow causing the congestion; and
       stop the transmit queue for at least one round trip time (RTT), wherein the RTT is a software programmed value and is updated periodically.

12. The SFA communication system of claim 11, wherein the CNP includes information for determining the flow to be stopped, and wherein the information includes a hash computed based on connection information.

13. The SFA communication system of claim 12, wherein the source SFA is further configured to:
    convert the hash into a receive processing engine index, wherein the hash and the receive processing engine index are used for identifying the transmit queue.

14. The SFA communication system of claim 11, wherein the receive SFA is further configured to:
    determine that a receive buffer is experiencing underruns; and in response to determining that the receive buffer is experiencing the underruns, automatically generate the CNP.

15. The SFA communication system of claim 11, wherein the receive SFA is further configured to:
    detect an explicit congestion notification (ECN); and
    automatically generate the CNP in response to the ECN.

16. The SFA communication system of claim 11, wherein the source SFA is further configured to:
    determine that a transmit port is congested; and
    in response to determining that the transmit port is congested, automatically generate the CNP.

17. The SFA communication system of claim 11, wherein the CNP includes an exponential backoff time.

18. The SFA communication system of claim 11, wherein the CNP is a user datagram protocol packet sent to a reserved destination port of the source SFA.

19. The SFA communication system of claim 11, wherein the source SFA is further configured to forward the CNP to a congestion notification queue, wherein the congestion notification queue is a dedicated queue optimized to handle shallow, small packets at a high burst rate, and wherein the source SFA is further configured to process the congestion notification queue by processing the dedicated queue at a highest priority that is assigned using priority-based flow control (PFC).

20. The SFA communication system of claim 11, wherein the source SFA is further configured to:
    select a receive block from a plurality of receive blocks in the source SFA based on the CNP; and
    forward the CNP to a dedicated congestion notification queue of the receive block.

* * * * *